United States Patent
Sinn et al.

(10) Patent No.: US 6,622,152 B1
(45) Date of Patent: Sep. 16, 2003

(54) REMOTE LOG BASED REPLICATION SOLUTION

(75) Inventors: Richard Pong Nam Sinn, Milpitas, CA (US); Kenneth S. Chia, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,958

(22) Filed: May 9, 2000

(51) Int. Cl.[7] .......................... G06F 12/00; G06F 17/30
(52) U.S. Cl. ........................ 707/204; 707/200; 707/201
(58) Field of Search ................................. 707/103, 201, 707/202–204, 10, 8, 200

(56) References Cited

U.S. PATENT DOCUMENTS

| | | | |
|---|---|---|---|
| 5,412,801 A | * 5/1995 | de Remer et al. ............ 707/10 |
| 5,708,812 A | 1/1998 | Van Dyke et al. ........... 395/712 |
| 5,745,753 A | * 4/1998 | Mosher, Jr. .................. 707/202 |
| 5,761,419 A | 6/1998 | Schwartz et al. ...... 395/200.34 |
| 5,844,553 A | 12/1998 | Hao et al. .................... 345/329 |
| 5,893,116 A | 4/1999 | Simmonds et al. ......... 707/201 |
| 5,995,980 A | * 11/1999 | Olson et al. .................. 707/10 |
| 6,438,538 B1 | * 8/2002 | Goldring ........................ 707/3 |
| 6,526,418 B1 | * 2/2003 | Midgley et al. ............ 707/204 |

\* cited by examiner

*Primary Examiner*—Greta Robinson
*Assistant Examiner*—Susan Rayyan
(74) *Attorney, Agent, or Firm*—Oppenheimer Wolff Donnelly LLP (57) ABSTRACT

A method, apparatus and program storage device for optimizing a relational database management system is provided. The method employs a replication solution wherein both Apply and Capture utilities are co-located on the target system. Changes detected by the Capture utility are entered in an internal staging area on the target system. The method allows the transformed database management system to perform more efficiently than the original system, while providing the same results.

27 Claims, 4 Drawing Sheets

REMOTE LOG BASED REPLICATION SOLUTION

BACKGROUND OF THE INVENTION

1. Field of the Invention

This invention relates in general to database management systems performed by computers, and in particular to the optimized remote log based data replication technique wherein Capture and Apply utilities are co-located on a target system, thereby eliminating communications overhead and providing an improved setting for building data warehouses and many other replication solutions.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

In RDBMS software all data is externally structured into tables. The SQL interface allows users to formulate relational operations on the tables either interactively, in batch files, or embedded in host language, such as C, COBOL, etc. Operators are provided in SQL that allow the user to manipulate the data, wherein each operator operates on either one or two tables and produces a new table as a result. The power of SQL lies on its ability to link information from multiple tables or views together, to perform complex sets of procedures with a single statement.

A data warehouse is a subject-oriented, integrated, non-volatile, time-variant collection of data suited to the decision support needed at a certain network location of the enterprise data environment. For this purpose the IBM company created several replication products. One such product is named DataPropagator Relational Version 5.1, useable for AS/400 systems, having such features as efficient architecture for automatic Capture and asynchronous propagation of data changes to DB2 databases, applicable for building data warehouses and creating client/server, distributed, or mobile applications. This product provides for automatic maintenance of consistent copies of relational data in the databases, and has a change-Capture component that Captures all application table changes. It utilizes subscription sets for transaction consistency, and supports full refresh and update change replication, update-anywhere replication, DB2 views-based replication, event-driven and continuous replication. Replication can help decrease batch workloads by replicating data in the background throughout the day.

Businesses today benefit from replicating data across a range of applications and business sites, to improve business cycle times and customer responsiveness. Frequently, these applications must share data with legacy applications on the host. Data replication can automatically deliver the shared data to the target platform, improving data availability and data access performance, and accommodating data restructuring and minimizing network load. This can improve employees' decision making capabilities. The decision-support databases assist in day-to-day decision-making activities, from determining what items to stock in various stores, to identifying customer sets for new products.

Data replication can improve application deployment and the existing application backlog can be reduced, since the majority of these applications are based on the relational model and use standard SQL. Data replication enables use of these applications by mapping, reformatting, and delivering data from legacy environments to relational databases elsewhere. In order to increase online throughput, replication supports off-load query processing to make room for increasing transaction processing requirements. Off-loading query processing reduces contention that impacts online transaction processing (OLTP) response time. Businesses are migrating applications from legacy systems or replicating data between multivendor environments. This reduces application development time and reduces application maintenance costs.

DataPropagator Relational 5.1 provides read-only, update-anywhere, and on-demand replication between relational source and target processors. It consists of the following autonomous components and programs. Administration and replication control is performed by Control Center, Capture utility is used to Capture changes made to data on replication sources, and Apply utility reads previously Captured changed data and applies it to target tables. The use of Capture and Apply utilities is known in the art, as described, for example, in U.S. Pat. No. 5,995,980, incorporated herein by reference.

The Control Center is used to define tables as sources, called replication sources, define target table definitions, called replication subscriptions, clone replication subscriptions to other servers and remove replication sources or subscriptions no longer needed. Whenever a replication request from the Control Center is submitted, such as a command defining a replication source, the processing information is generated as SQL statements. The statements may be run immediately, or saved in a file, which can be edited and the statements can be run at a later time from a replication folder object in the Control Center. Deferred SQL files let a user customize the replication tasks for his application needs.

In a conventional system, the Capture component, located in a source computer, captures changes made to data in tables defined as replication sources by reading the database transaction log or journal, without making any changes to the sources. It is performed asynchronously to business applications using the same replication sources. The captured changes are placed in a staging area Change Data (CD) table, with transaction detail stored separately in a Unit of Work (UOW) table, both located in the source computer.

Ordinarily, the Apply component, located in a target computer, reads the changed data previously captured and stored in the staging area table and applies it to the target tables on the target computer. Apply components can also read data directly from the source tables, for example, for a full refresh. Supporting update and refresh copying provides greater flexibility and automation in a replication environment. The Apply component also massages the data to user specifications, as it copies data to the targets. SQL statements can be prepared to create new columns, summarize data, translate data, join data and do other data transactions.

The conventional Apply component allows the user to create read-only copies, user copy tables, which represent source data at a particular point in time, point-in-time tables, which represent source data at a particular point in time and some overhead columns, history tables, staging area tables (which can be used as a source for further copies without recapturing changes, thus supporting a consistent data environment and providing flexibility in data distribution across the network), updatable copies, and replica tables. Updates to a replica table are automatically applied to the original source table of the replica, provided no conflicts are detected.

The Apply component, running at the replica site, detects update conflicts after they occur during the subscription cycle. An Apply instance can process many subscriptions at a single site. Multiple Apply instances can run concurrently at different sites/platforms, each processing different numbers and types of subscriptions from the same source. Each subscription can have different definitions, refresh criteria, and timing.

One problem associated with data warehouses involves aggregating the extremely large amounts of data stored within application databases with the frequent input of large amounts of data. By aggregating the data stored within the data warehouse with newly inputted data, the raw data is translated into the most current meaningful information that can be relied upon by decision makers, which should have the most up-to-date and current information. However, the aggregation takes a long time to perform and overwhelms the application processor, because in the conventional systems all the pertinent data stored within the data warehouse is re-aggregated along with the newly inputted data.

Figure 1:
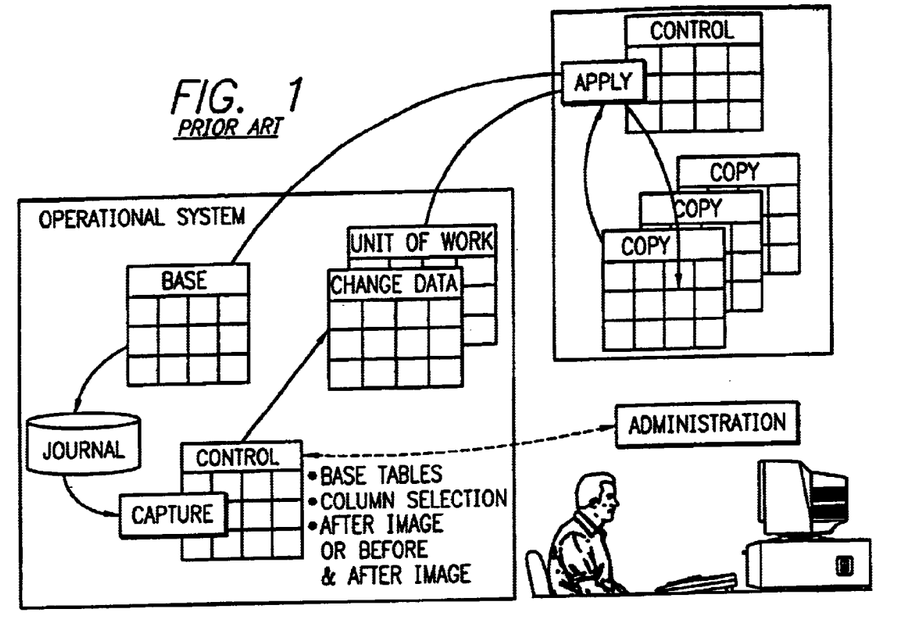
FIG. 1 illustrates a computer hardware and software environment enabling data replication, according to the prior art.

The conventional replication products, such as IBM Data Propagator, MIMX, DATAMIRROR and others, are using a client/server approach. There, a Capture component is running on the source system to capture changes, and an Apply component runs on the target system to apply changes. Thus, when replicating from one system to another, two distinct components are running on each of the systems, using some amount of disk space, CPU time and other management overhead. This type of data replication technique is shown in FIG. 1.

In this conventional replication system, the Capture component captures base table changes from a journal, the changes are put into an internal staging area ("Change Data" and "Unit of Work" table). Then, the Apply component from the remote system picks up changes from the staging area tables on the source site, thus replicating data from one system into another.

In contrast with some other log-base platforms, such as AIX, MVS and NT, the AS/400 system uses Journals as the vehicle for tracking database changes. In most cases, a named Journal will be created in an AS/400 library and work with one Journal Receiver at a time. Thus, a Journal can be viewed as a controller module of a Journal Receiver, which is a table. When operations (such as SQL insert, update, delete and other native AS/400 operations) are applied to database objects, the changes, known as Journal Entries in AS/400, on the database objects are sent to a Journal Receiver.

While there have been various techniques developed for optimizing the performance of SQL statements, there is a need in the art for optimization techniques involving data replication. Therefore, it would be advantageous to provide a method for the computer that accesses a source site database to be able to quickly replicate data on a target computer site. A new approach utilizing remote journal support, therefore, allows the user to offload the CPU usage and direct access storage device (DASD) consumption away from the main production system and directly to the operating system where the final destination of the data propagation is. The present invention provides this advantage by placing the Capture component and the tables with newly inputted and changed data on the same, target site. This method eliminates network overhead, and allows for more efficient and better CPU distribution control, ideal for building data warehouses and many other replication solutions.

SUMMARY OF THE INVENTION

One preferred embodiment of the present invention includes a method of optimizing a query in a computer system, in which data is retrieved from a relational database stored in an electronic storage device coupled to the computer system. The method utilizes a remote journaling solution wherein both Capture and Apply utilities are co-located on the target system. Unit of Work (UOW) and Change of Data (CD) tables also exist on the target system, and together serve as a staging area. The combination of these components on the target system eliminates the conventional Apply utility's network management responsibility, substantially reduces communications overhead, and reduces CPU and DASD consumption for significantly increased efficiency.

Another preferred embodiment of the present invention is a computer system for optimizing a query, utilizing the above-described method embodiment of the present invention.

Yet another preferred embodiment of the present invention is a program storage device readable by a computer tangibly embodying a program of instructions executable by the computer to perform the above-mentioned method embodiment of the present invention.

The foregoing and other objects, features, and advantages of the present invention will be apparent from the following detailed description of the preferred embodiments, which makes reference to several drawing figures.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized and structural and functional changes may be made without departing from the scope of the present invention.

Figure 2:
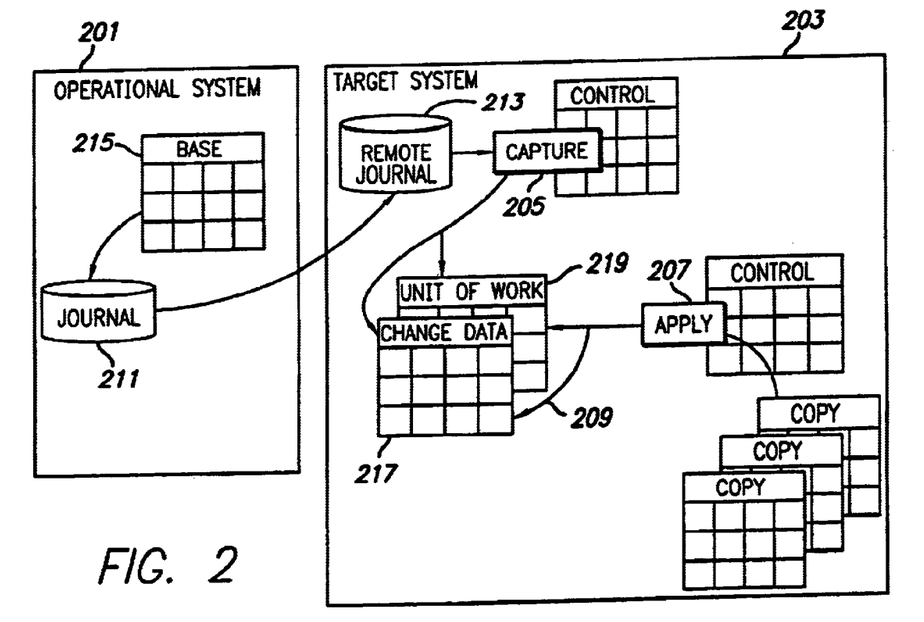
FIG. 2 illustrates a computer hardware and software environment enabling remote journaling, usable in the present invention.

The present invention discloses a method, apparatus and program storage device for optimizing the performance of SQL statements accomplishing data replication on a remote computer site via a remote journaling technique, presented in FIG. 2.

Figure 3:
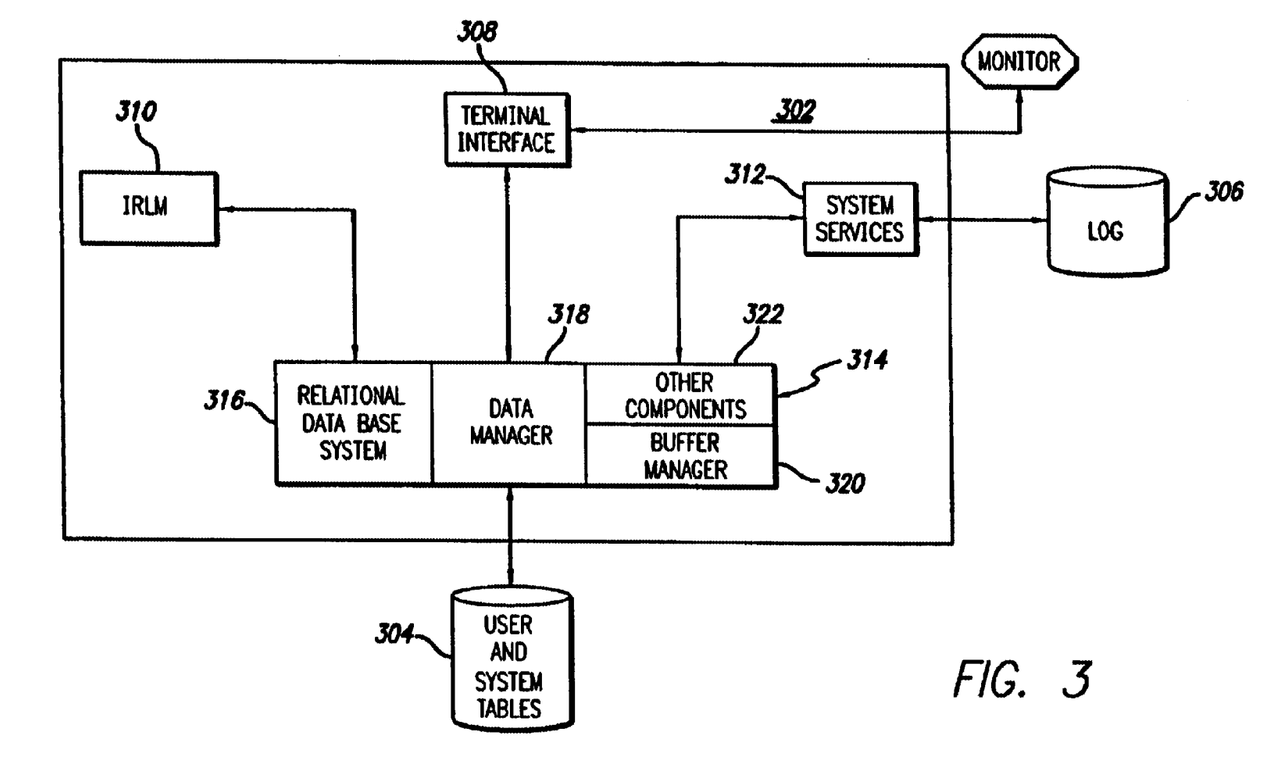
FIG. 3 illustrates a computer hardware and software environment usable in the present invention.

FIG. 3 illustrates an exemplary computer hardware environment, including a computer system 302 comprised of one or more processors executing instructions stored in its associated computer memory, that could be used with the present invention. The operating memory can be loaded with the instructions received through an optional storage drive or through an interface with the network. In one exemplary environment, the replication technique of the present invention is utilized on the same processor site where the application table is stored. However, the technique is especially advantageous when used in a network environment, having at least a source site with a source processor networked to at least a target site with a target processor.

Each processor is connected to one or more electronic storage devices, such as user and system files 304, log 306, and disk drives, that store one or more relational databases. These drives may comprise, for example, optical disk drives, magnetic tapes and/or semiconductor memory. The storage drive permits receipt of a program storage device, such,as a magnetic media diskette, magnetic tape, optical disk, semiconductor memory and other machine-readable storage device,and for program steps recorded on the program storage device to be read and transferred into the computer memory. The recorded program instructions may include the code for the optimized remote journaling technique of the present invention. Alternatively, the program steps can be received into the operating memory or over the network.

Operators of the computer system 302 use a standard operator terminal interface 308, such as IMS/DB/DC, CICS, TSO, OS/2 or other similar interface, to transmit electrical signals to and from the computer system 302, that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the OS390 or OS/2 operating systems. Those skilled in the art will recognize, however, that the present invention has application to any RDBMS software that uses SQL, and may similarly be applied to non-SQL queries.

As illustrated in FIG. 3 the DB2 architecture includes three major components: the Resource Lock Manager (IRLM) 310, the Systems Services module 312, and the Database Services module 314. The IRLM 310 handles locking services, because DB2,treats data as a shared resource, thereby allowing any number of users to access the same data simultaneously, and thus concurrency control is required to isolate users and to maintain data integrity. The Systems Services module 312 controls the overall DB2 execution environment, including managing log data sets on the electronic storage device 306, gathering statistics, handling startup and shutdown, and providing management support.

At the center of the DB2 architecture is the Database Services module 314. The Database Services module 314 contains several submodules, including the Relational Database System (RDS) 316, the Data Manager 318, the Buffer Manager 320 and other components 322, such as an SQL compiler/interpreter. These submodules support the functions of the SQL language, i.e., definition, access control, retrieval, and update of user and system data. The Database Services module 314 preferably comprises one or more processors that execute a series of computer-executable programming instructions to respond to a user query.

The remote journaling technique of the preferred embodiments of the present invention is also advantageous when used in a network environment, wherein network dependency of Apply and Capture may be eliminated through the co-location of the two utilities on the target site. In a network environment the source site has the application table, and the target site is the remote site where the replicated data is needed. The present invention maintains rapid and timely remote data replication, minimizes the load on the network to initialize and maintain the remote data replication, and minimizes impact to source-site transaction processing while concurrently maintaining remote data replication. The present invention works with any of the heterogeneous sources supported by IBM DataPropagator Relational (DPropR) product, such as IMS, DB2 for VMNVSE, DB2 for OS/390, DB2 for AS/400, DB2 Common Server and DB2 Universal Database.

In a conventional environment, a base table will only be journaled to a Journal located on the same computer site. However, in the preferred embodiments of the present invention utilizing the optimized replication technique, data replication to a target site is improved by a remote journaling technique, incorporated, for example, in the OS/400 Version 4 Release 2, which provides for a Remote Journal to be kept on the target site. Both replication component programs, Capture and Apply, incorporate the remote journaling support in the Data Propagator utility, and when a user sets up remote journaling for a source site-based database file, he picks a remote system to shadow the remote journal into. In the remote journaling technique, two pairs of Journal/Journal Receiver files are kept, one on a source site and another on a target site.

A preferred embodiment of the present invention which includes remote journaling is presented in FIG. 2. In the same way that the conventional Capture/400 component analyzes Journal 211 entries to capture changes made on a base table 215 when both are located on the same site, the remote journaling support is enabled by the Capture/400 205 component located on the same, target computer site 203 with the Remote Journal 213, and used to analyze its entries. In this case, the remote journaling function is setup using the OS/400 system APIs or commands. Both the Capture 205 and Apply 207 components run on the same system, on the target site 203. The Capture component 205 captures the changes and places the records describing the changes in an internal staging area 209 on the same system site where the Apply component is running. This method eliminates network overhead, allows for more efficient and better CPU distribution control, and provides an environment that is ideal for building data warehouses and many other replication solutions.

The present invention is embodied in the RDBMS computer program, such as the DpropR product, executed by the computer system. The CD table 217 and the UOW table 219 are preferably obtained with the Capture component of the DpropR product, but can be made by any utility which captures changes, introduced via commands INSERT, UPDATE and DELETE, made to data in the application table(s) 215, defined as replication sources, by reading the database transaction log or remote journal.

In the optimized replication technique of the present invention the CD table 217 and UOW table 219 are joined to form an internal staging area 219 at the target system 203. This eliminates conventional network dependency of Capture utilities, thereby improving efficiency and enabling heightened performance.

Figure 4:
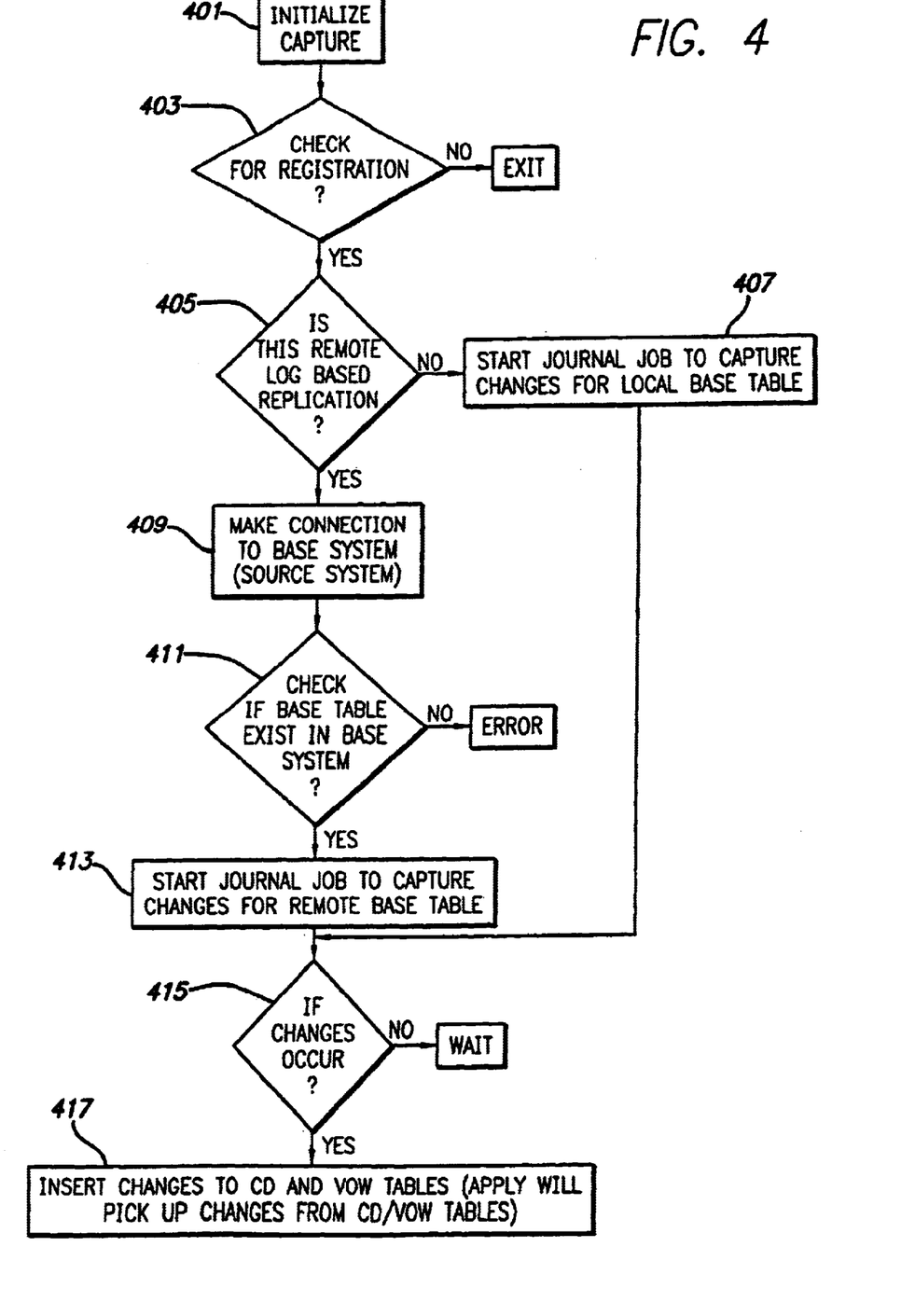
FIG. 4 is a flow chart detailing events involved in a Capture routine.

Capture utility routines as executed in a remote log based replication system exemplary of the present invention are detailed in a flow chart in FIG. 4. The log based replication method begins at 401 with the initialization of the Capture utility. Registration is checked at 403, and upon confirmation, it is determined whether or not the replication is remote log based at 405. If not, the Journal is accessed at 407 to retrieve and execute the job entailing capture of changes for a local base table. Otherwise, the procedure continues at 409, where the client connects to the base system, in this case the source system, and checks for a base table at 411. When the base table is located, the Journal is accessed at 413 to retrieve and execute the job entailing capture of changes for the remote base table. At 415, which may succeed either 407 or 413, the method entails waiting for changes to the table to occur. The method then proceeds to 417 where changes are inserted to the CD and UOW tables, collectively forming the staging area.

Figure 5:
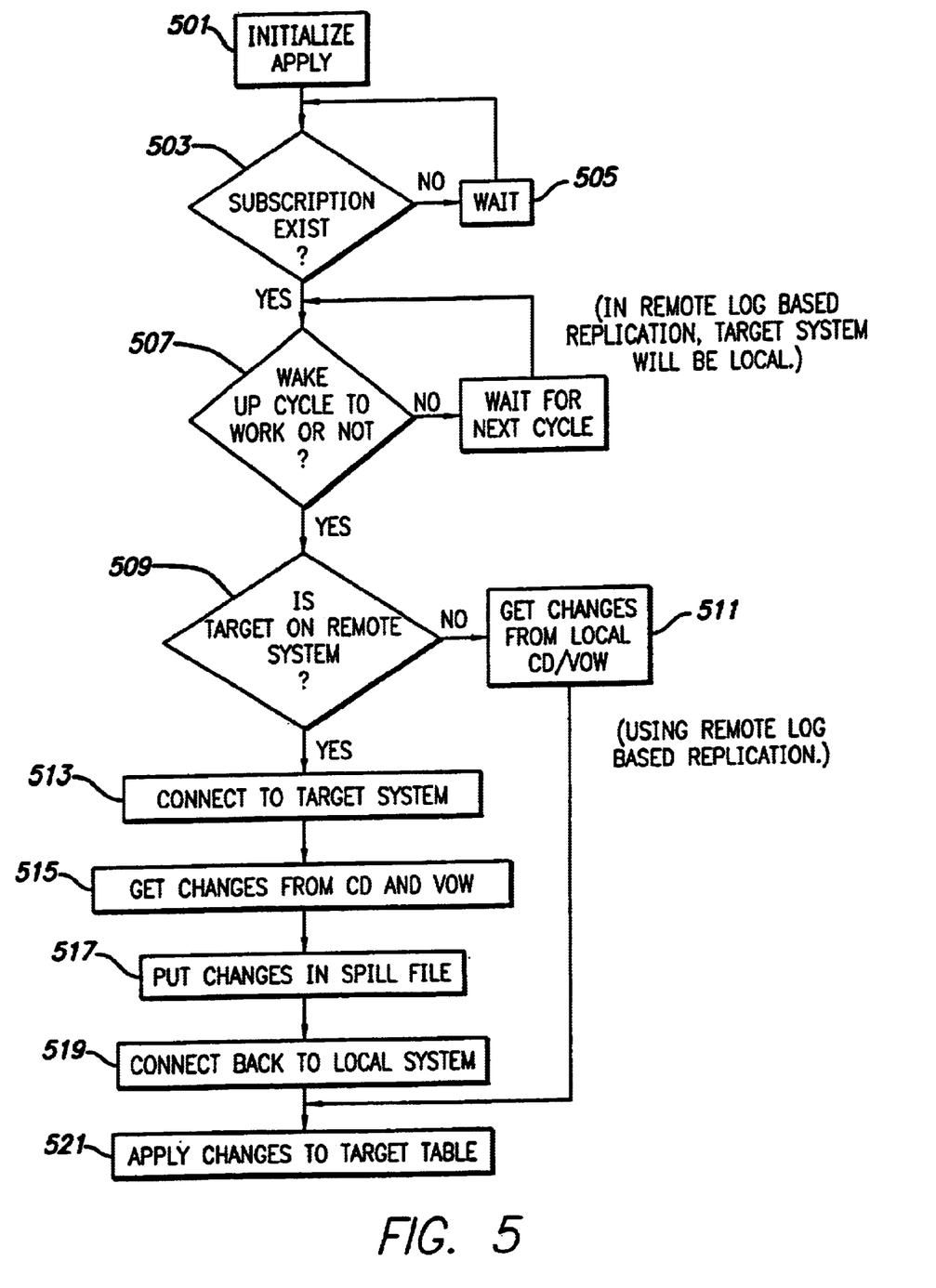
FIG. 5 is a flow chart detailing events involved in an Apply routine.

Likewise, Apply utility routines as executed in a similar system are detailed in a flow chart in FIG. 5, and picks up where the Capture utility left off. The Apply utility is initialized at 501, and a subscription is searched for at 503. The method entails waiting for the subscription at 505, in the event that one does not initially exist, and then proceeding to 507, where an appropriate cycle is waited for. At the first available cycle, the method proceeds to 509, where the location of the target is determined. If the target is on a local system, then changes are acquired from the local staging area at 511. Otherwise, a connection to the target system is established at 513, changes are acquired from the remote staging area at 515, the changes are entered in a spill file at 517, and a connection is re-established with the local system. The method proceeds, whether from 511 or 519, at 521 where the changes are applied to the target table.

Remote journaling employed in embodiments of the present invention enables both Change Data tables and Unit of Work tables to be journaled. This, coupled with the removal of the Capture process from the main production system, yields significant DASD savings. Further, the combined presence of Capture and Apply utilities on a single system, for example the target system, eliminates the need for Apply to handle remote network connections, yielding additional CPU savings. An additional advantage of the novel solution of the present invention is a significant reduction in replication solution complexity.

While conventional methods for data propagation between two systems are hindered by communications difficulties and errors, registrations that take advantage of remote journaling according to embodiments of the present invention are relieved of such problems. This independence from communications overhead and error potential results in reduced error and limited need for error recovery when initializing a replication solution.

Other advantages are anticipated with use of embodiments of the present invention. For example, improved management of database system resources will result in areas beyond examples previously cited as a result of journal receivers on the main production system not being dependent on Capture. In other words, the conventional requirement for maintaining journal receivers to be utilized by Capture is eliminated by the remote journaling approach of the present invention. Also, reduction in communication overhead translates to faster differential refreshes by Apply utilities. A further example of such an advantage is that according to embodiments of the present invention, the conventional interim step of an temporary file, called a spill file 517, for changes to be logged at the target before they are applied is eliminated, resulting in potential for improved system performance.

It will be appreciated by those skilled in the art that embodiments of the present invention are not limited to the particular embodiments disclosed herein. Systems and methods which depart from the exemplary embodiments of the instant specification are anticipated and will fall within the spirit and scope of the present invention. For example, the remote journaling system may exist on a network comprising more than one operational or target system. The inventive remote journaling may also be employed on various platforms with various database software packages.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for database replication, the method comprising:
    at a single site, performing the steps of:
        capturing a base table change from a remote journal located on the single site, the remote journal receiving and storing entries from a local journal located on a source site;
        putting said base table change into a staging area; and
        retrieving said base table change from said staging area and applying said change to a target table, the target table being located on the single site.

2. The method according to claim 1, wherein said capture is accomplished by a capture component and said retrieving and applying are accomplished by an apply component.

3. The method according to claim 1, wherein said single site is said target site.

4. The method according to claim 1, wherein said base table is located on a first system and said change is stored in a journal.

5. The method according to claim 4, wherein said journal is a remote journal, the remote journal residing on a system remote to said first system.

6. The method according to claim 1, wherein said staging area comprises a change data table and a unit of work table.

7. The method according to claim 1, wherein said staging area is located on said target site.

8. The method according to claim 1, wherein said journal is a local journal, the local journal located on said first system.

9. The method according to claim 8, further comprising:
    at least a remote journal, the remote journal located on at least one target system; and
    said remote journal receiving entries from said local journal.

10. An apparatus for performing optimized database replication, the performance comprising:
    at a single site, performing the steps of:
        capturing a base table change from a remote journal located on the single site, the remote journal receiving and storing entries from a local journal located on a source site;
        putting said base table change into a staging area; and
        retrieving said base table change from said staging area and applying said change to a target table, the target table being located on the single site.

11. An apparatus for performing optimized database replication, the apparatus comprising:
    a computer having a first electronic storage device coupled thereto for storing a source database, a replication being performed by said computer to replicate data from said source database;
    an operational system having a second electronic storage device coupled thereto for storing a target database;

said target database having at least a base table and at least a local journal;

said target database comprising a target table and said operational system being a target system;

at least a remote journal for receiving and storing entries from said local journal, said remote journal located on said target system;

at least a capture utility for capturing changes to said base table from said remote journal and transferring said changes to a staging area;

at least an apply utility for retrieving said changes from said staging area and applying said changes to said target table; and said capture utility located on said target system and said apply utility located on said target system.

12. The apparatus of claim 11, wherein said staging area comprises a unit of work table and a change of data table.

13. A program storage device readable by a computer and tangibly embodying a program of instructions executable by the computer to perform a method for remote log based database replication, the replication being performed by the computer to replicate data from a database stored in an electronic storage device coupled to the computer, the method comprising:

at a single site, performing the steps of:
capturing a base table change from a remote journal located on the single site, the remote journal receiving and storing entries from a local journal located on a source site;
putting said base table change into a staging area; and
retrieving said base table change from said staging area and applying said change to a target table, the target table being located on the single site.

14. The program storage device according to claim 13, wherein said capture is accomplished by a capture component and said retrieving and applying are accomplished by an apply component.

15. The program storage device according to claim 13, wherein said single site is said target site.

16. The program storage device according to claim 13, wherein said journal is a remote journal.

17. The program storage device according to claim 13, wherein said staging area comprises a change data table and a unit of work table.

18. The program storage device according to claim 13, wherein said staging area is located on said target site.

19. The program storage device according to claim 13, wherein said journal is a local journal, the local journal existing on said electronic storage device.

20. A method for database replication, the method comprising:

initializing a capture of a base table change to a base table located on a source site with a capture utility located on a target site, said change being captured from a remote journal located on the target site, the remote journal receiving and storing entries from a local journal located on the source site;

transferring said base table change from said capture utility to an apply utility and applying said change to a target table, the target table being located on the target site;

said capture being accomplished by a capture component and said retrieving and applying being accomplished by an apply component; and said capture component and said apply component co-existing on the target site.

21. The method according to claim 13, wherein said base table is located on a first system and said change is stored in a journal.

22. An optimized database replication device comprising:
a computer usable medium having computer readable program code means embodied therein for causing optimized database replication, the computer readable program code means in the optimized database replication device comprising:

computer readable code means for causing a computer having a first electronic storage device coupled thereto for storing a source database to replicate data from said source database;

computer readable code means for causing a computer having an operational system having a second electronic storage device coupled thereto to store a target database;

computer readable code means for causing a computer with said target database to have at least a base table and at least a local journal;

computer readable code means for causing a computer with said target database to generate a target table and said operational system being a target system;

computer readable code means for causing a computer to generate at least a remote journal for receiving and storing entries from said local journal, said remote journal located on said target system;

computer readable code means for causing a computer to generate at least a capture utility for capturing changes to said base table from said remote journal and transferring said changes to a staging area;

computer readable code means for causing a computer to generate at least an apply utility for retrieving said changes from said staging area and applying said changes to said target table; and computer readable code means for causing a computer to position said capture utility on said target system and position said apply utility on said target system.

23. The optimized database replication device according to claim 22, wherein said staging area comprises a unit of work table and a change of data table.

24. The optimized database replication device according to claim 22, wherein said staging area is located on said target site.

25. A method for performing optimized database replication comprising:

replicating data from a source database stored on a first electronic storage device coupled to a computer;

storing a target database on a second electronic storage device operably connected to an operational system, said target database having at least a base table and at least a local journal, said target database comprising a target table and said operational system being a target system;

receiving and storing entries from said journal on at least a remote journal located on said target system;

capturing changes to said base table from said remote journal and transferring said changes to a staging area with at least a capture utility; and retrieving said changes from said staging area and applying said changes to said target table with at least an apply utility, said capture utility located on said target system and said apply utility located on said target system.

26. The method according to claim 25, wherein said staging area comprises a unit of work table and a change of data table.

27. The method according to claim 25, wherein said staging area is located on said target site.

* * * * *

UNITED STATES PATENT AND TRADEMARK OFFICE
CERTIFICATE OF CORRECTION

PATENT NO.     : 6,622,152 B1
DATED          : September 16, 2003
INVENTOR(S)    : Richard Pong Nam Sinn and Kenneth S. Chia It is certified that error appears in the above-identified patent and that said Letters Patent is hereby corrected as shown below:

<u>Column 9,</u>
Lines 38 and 45, remove "claim 13" and insert -- claim 21 --.

Signed and Sealed this

Seventeenth Day of February, 2004

JON W. DUDAS
*Acting Director of the United States Patent and Trademark Office*